US008087436B2

(12) United States Patent
Danielson

(10) Patent No.: US 8,087,436 B2
(45) Date of Patent: Jan. 3, 2012

(54) MODULAR CONNECTOR

(75) Inventor: Robert Danielson, Ham Lake, MN (US)

(73) Assignee: Fastest, Inc., Roseville, MN (US)

( * ) Notice: Subject to any disclaimer, the term of this patent is extended or adjusted under 35 U.S.C. 154(b) by 465 days.

(21) Appl. No.: 11/845,288

(22) Filed: Aug. 27, 2007

(65) Prior Publication Data
US 2009/0001714 A1 Jan. 1, 2009

Related U.S. Application Data

(60) Provisional application No. 60/947,135, filed on Jun. 29, 2007.

(51) Int. Cl.
B65B 1/04 (2006.01)
(52) U.S. Cl. .......... 141/392; 285/39; 285/101; 285/119; 285/210; 285/920
(58) Field of Classification Search .................. 285/338, 285/346, 920, 148.5, 123.1, 148.3, 18, 309, 285/310, 311, 312, 119, 39, 98–103, 7; 74/18, 74/18.1, 18.2; 464/26, 27, 28; 141/311 R, 141/392; 222/631
See application file for complete search history.

(56) References Cited

U.S. PATENT DOCUMENTS

| | | | | |
|---|---|---|---|---|
| 1,340,785 A | * | 5/1920 | McMullin | 285/312 |
| 1,896,371 A | * | 2/1933 | Quarnstrom | |
| 2,444,414 A | * | 7/1948 | Anderson et al. | 285/312 |
| 2,603,509 A | * | 7/1952 | Eskin et al. | 285/18 |
| 2,782,044 A | * | 2/1957 | Gabriel et al. | 285/920 |
| 4,662,654 A | | 5/1987 | Marshall | |
| 4,716,938 A | * | 1/1988 | Weh et al. | |
| 5,165,727 A | * | 11/1992 | Valley | |
| 5,343,798 A | | 9/1994 | Meisinger et al. | |
| 5,507,537 A | | 4/1996 | Meisinger et al. | |
| 5,788,290 A | | 8/1998 | Meisinger | |
| 5,950,679 A | | 9/1999 | Danielson et al. | |
| 6,450,541 B1 | | 9/2002 | Bakke | |
| 6,997,083 B1 | | 2/2006 | Olszewski | |
| 2009/0001719 A1 | | 1/2009 | Danielson | |

FOREIGN PATENT DOCUMENTS

JP 11-020659 A 1/1999

OTHER PUBLICATIONS

U.S. Appl. No. 11/671,747, filed Feb. 6, 2007, inventor: Robert Danielson, title: A Quick Connect Connector With Tolerance Accommodation, 30 pages.
International Search Report for PCT/US2008/056515, dated Aug. 14, 2008.

* cited by examiner

Primary Examiner — James Hewitt
Assistant Examiner — Jay R Ripley
(74) Attorney, Agent, or Firm — Hamre, Schumann, Mueller & Larson, P.C.

(57) ABSTRACT

A modular connector system that permits changes to the connector, for example changes in the type of connection interface that is used and/or changes in the type of actuator that is used to actuate the connector. By making parts of the connector changeable, the connector can be changed so as to be able to connect to different fluid systems. This eliminates the need to have separate connectors for different fluid systems.

12 Claims, 18 Drawing Sheets

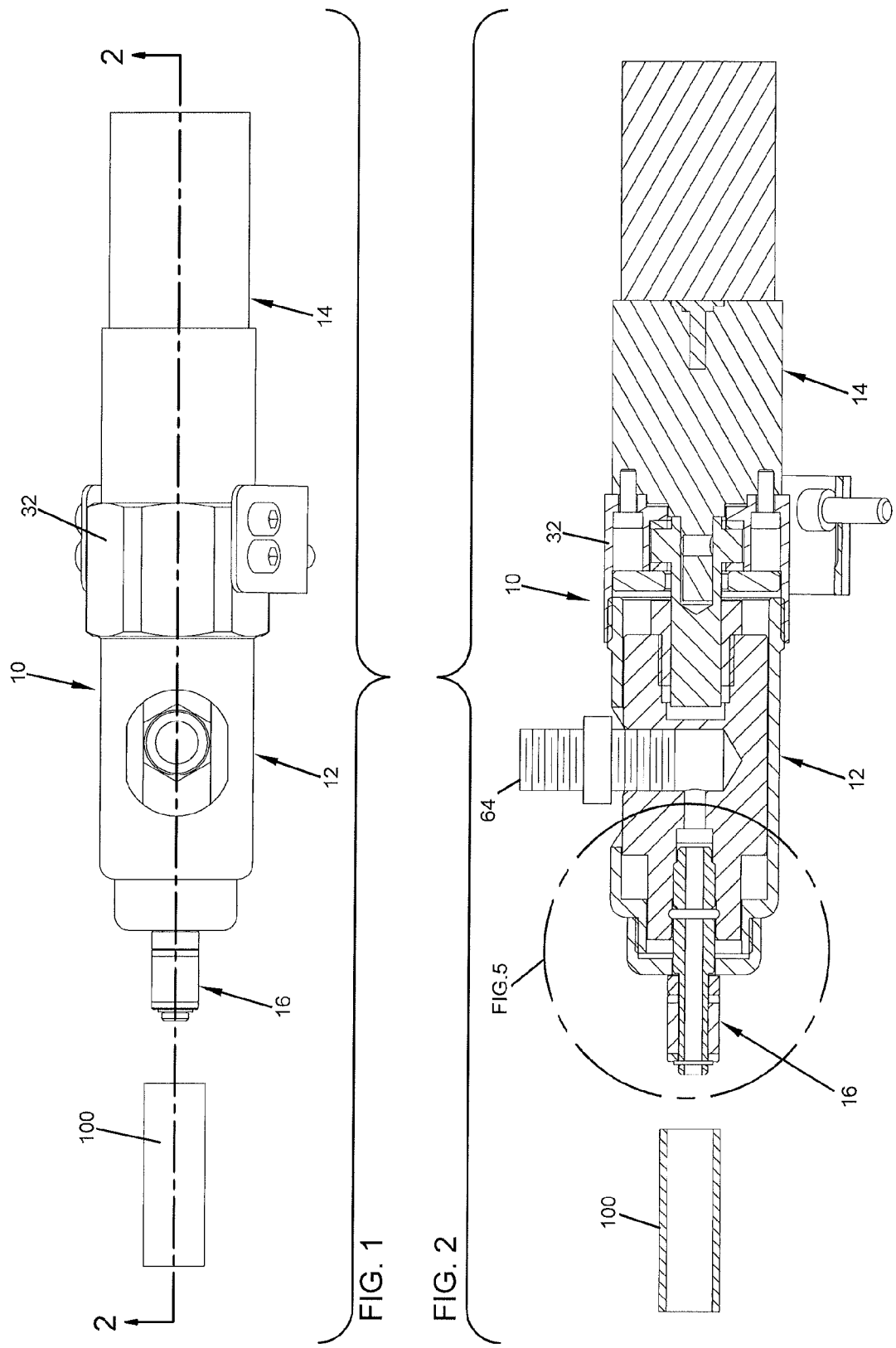

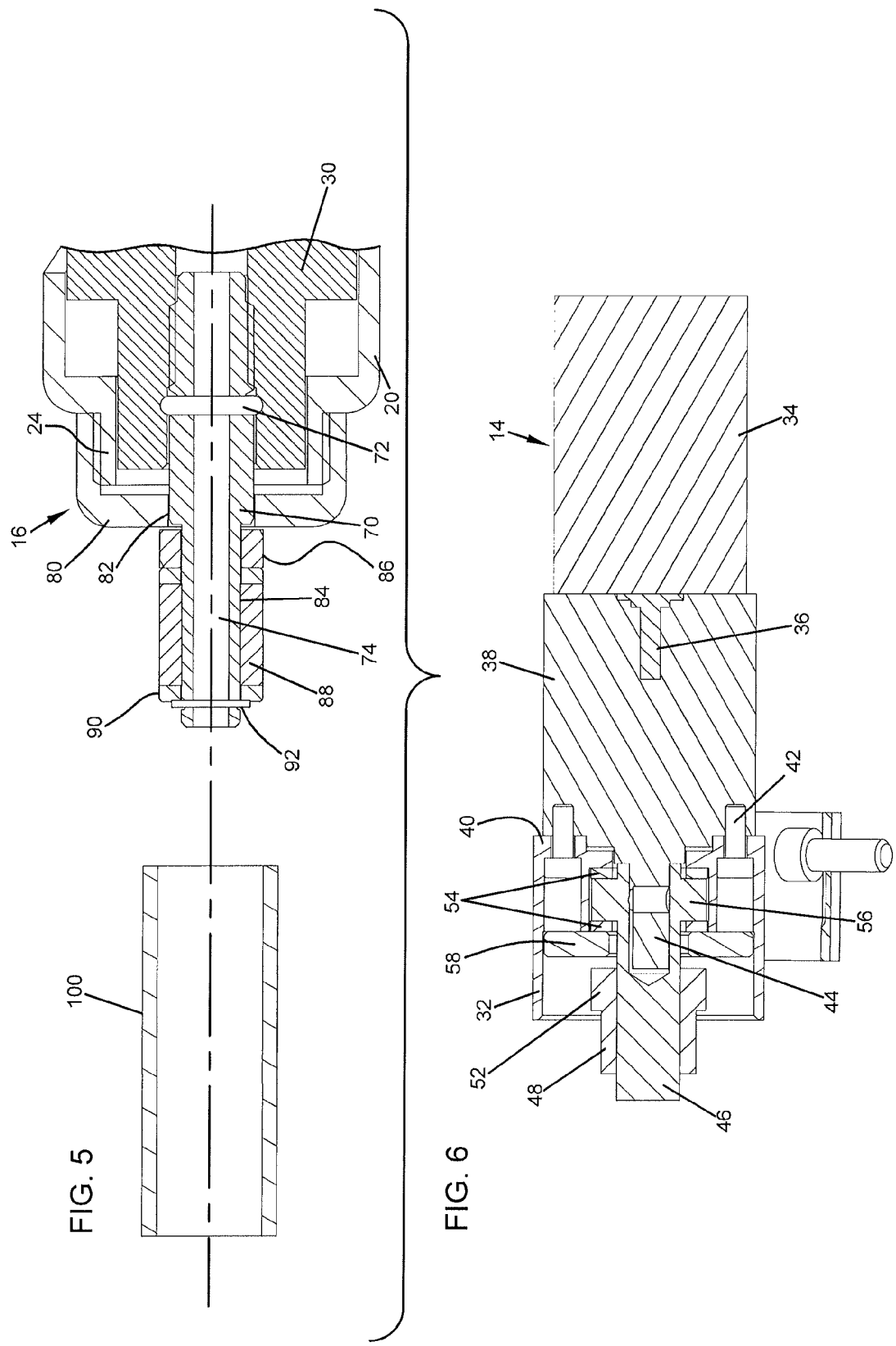

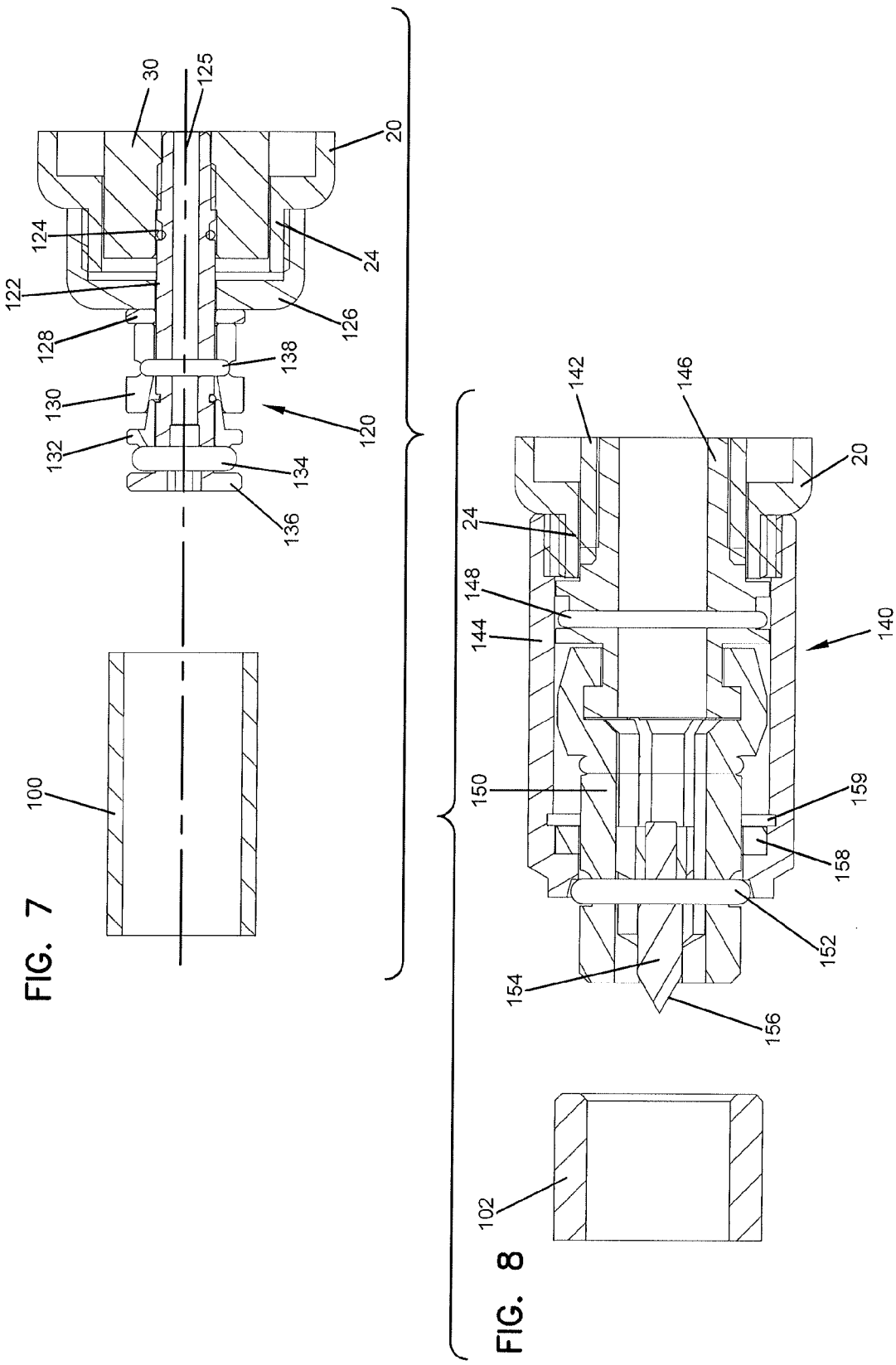

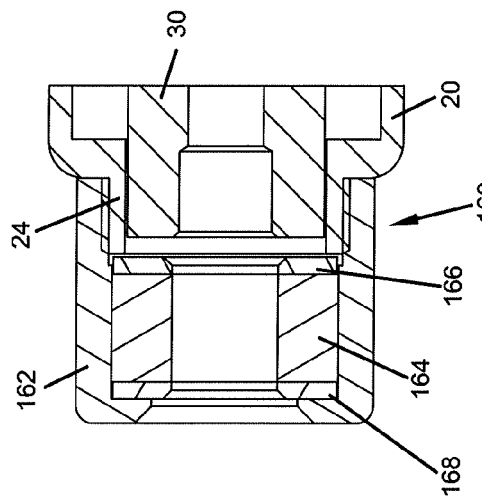
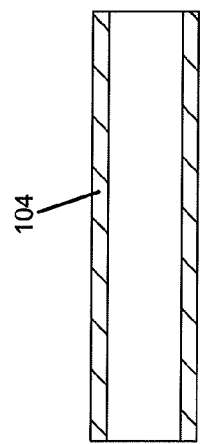
FIG. 9
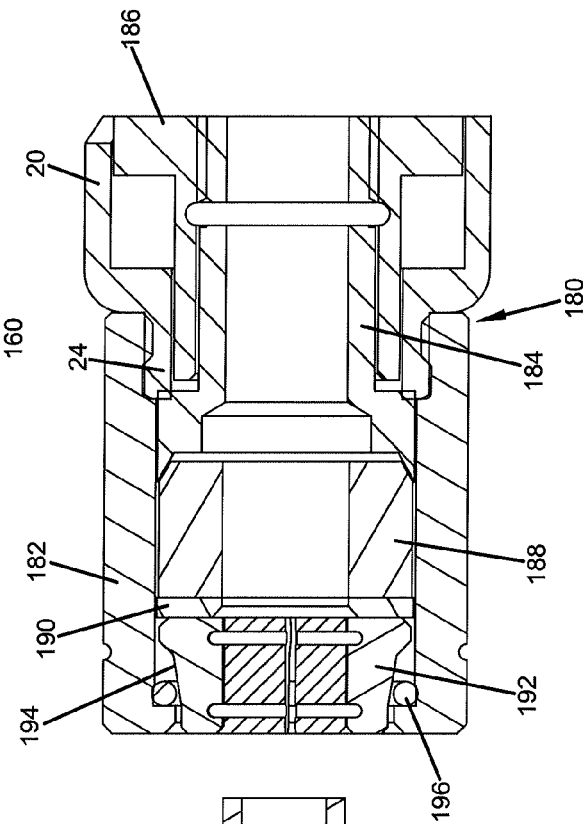
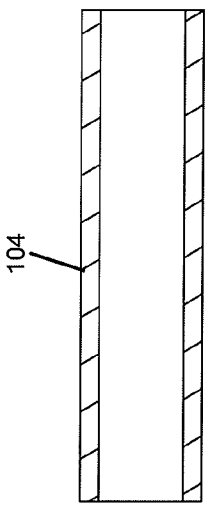
FIG. 10

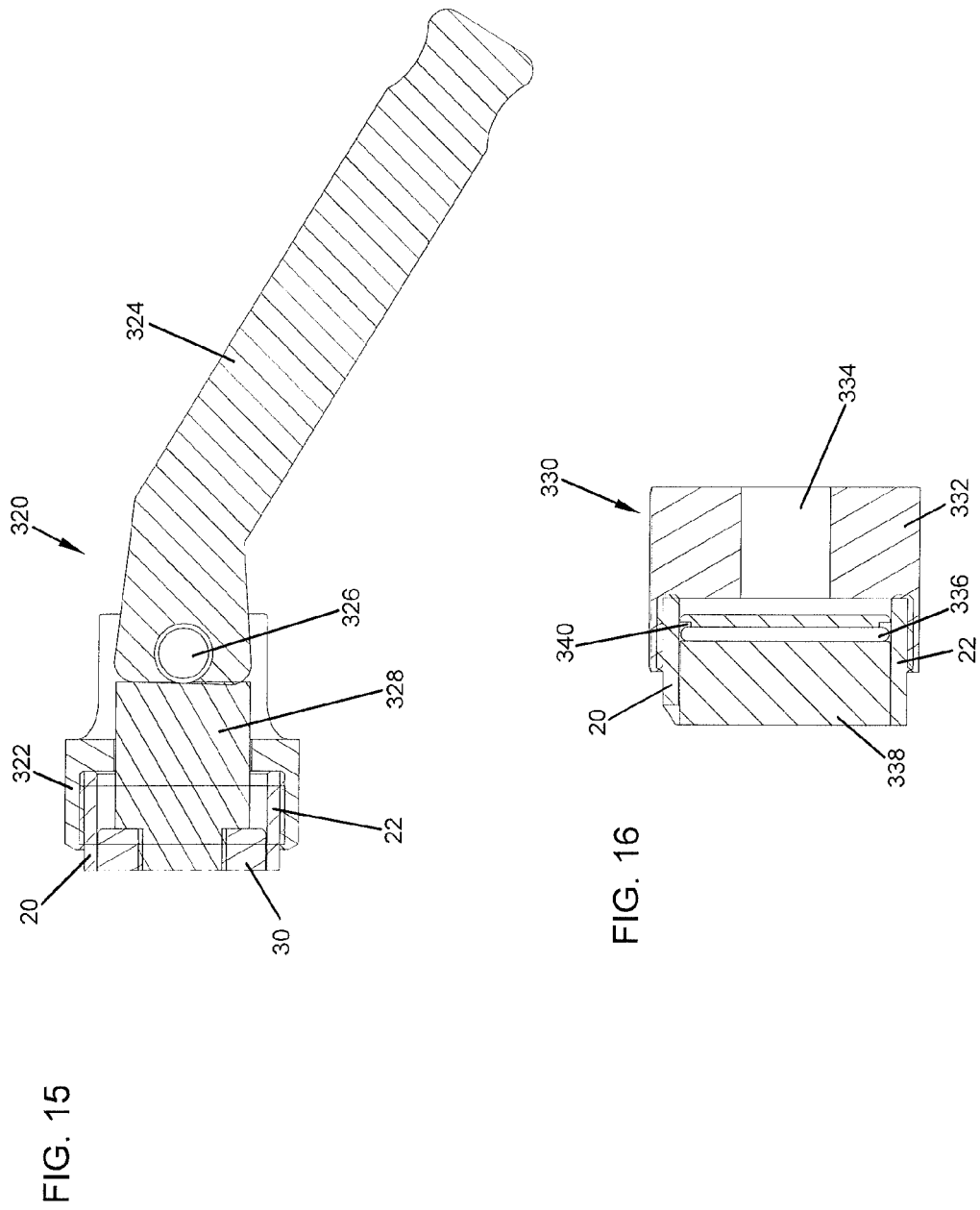

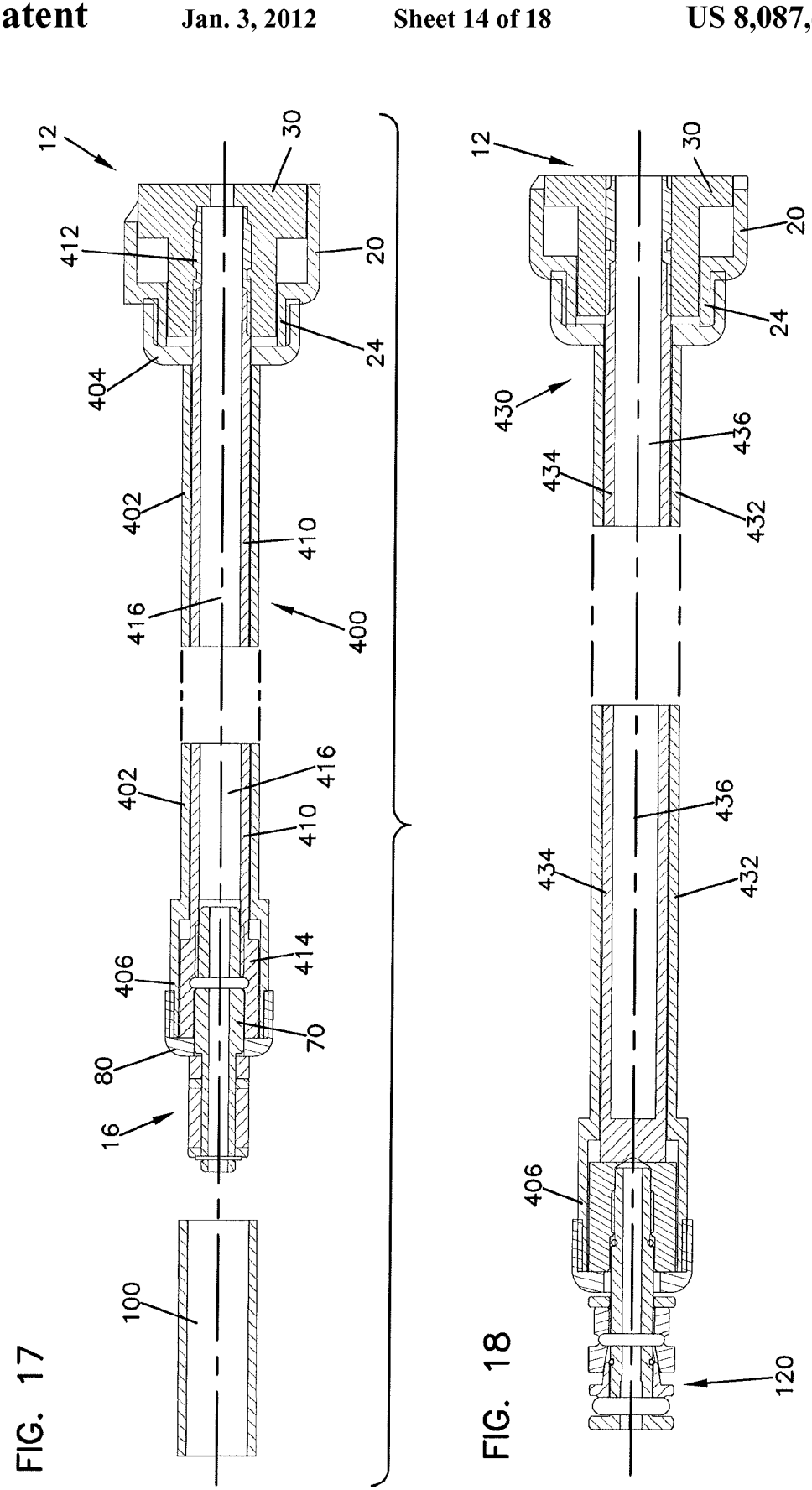

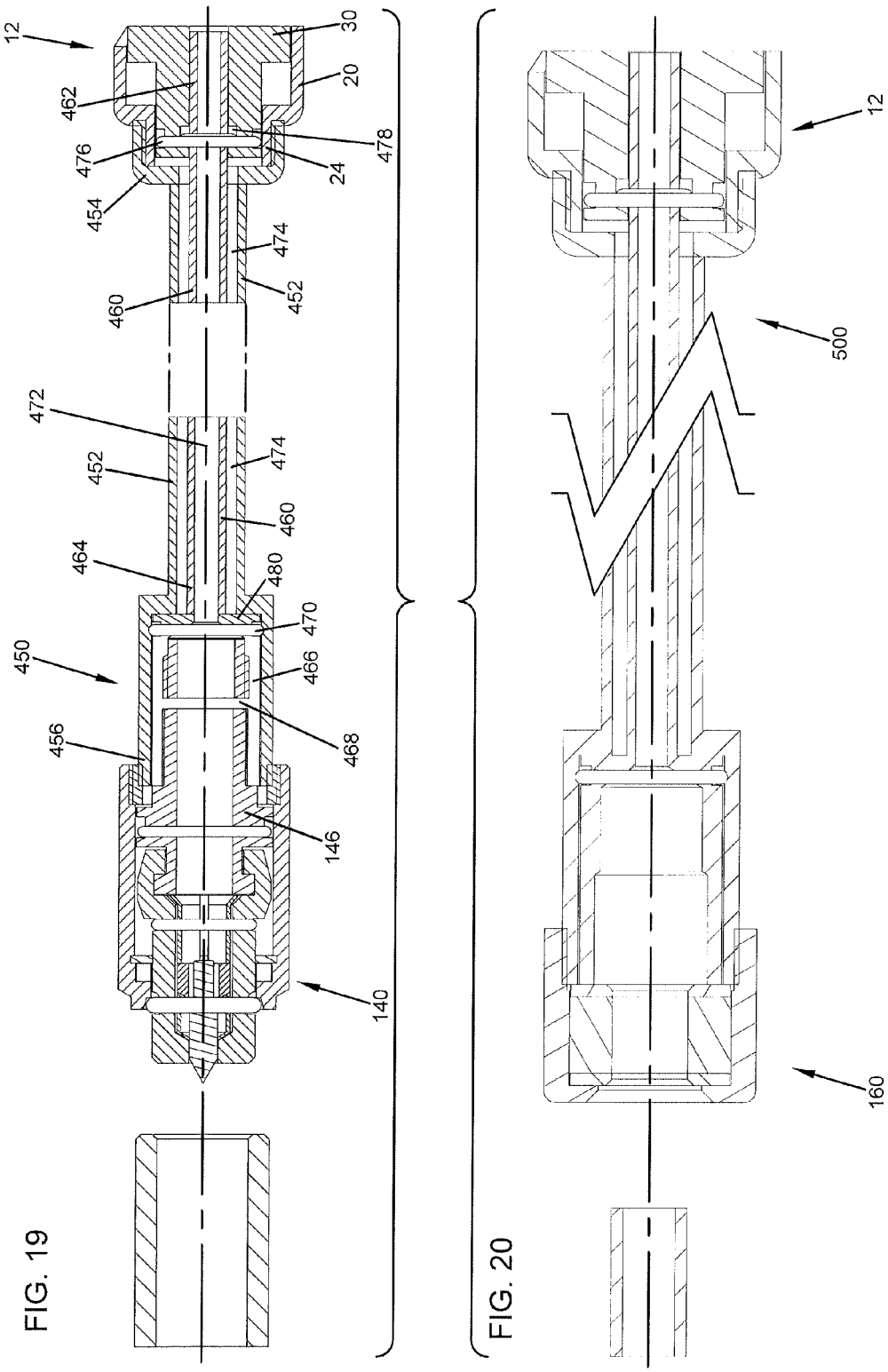

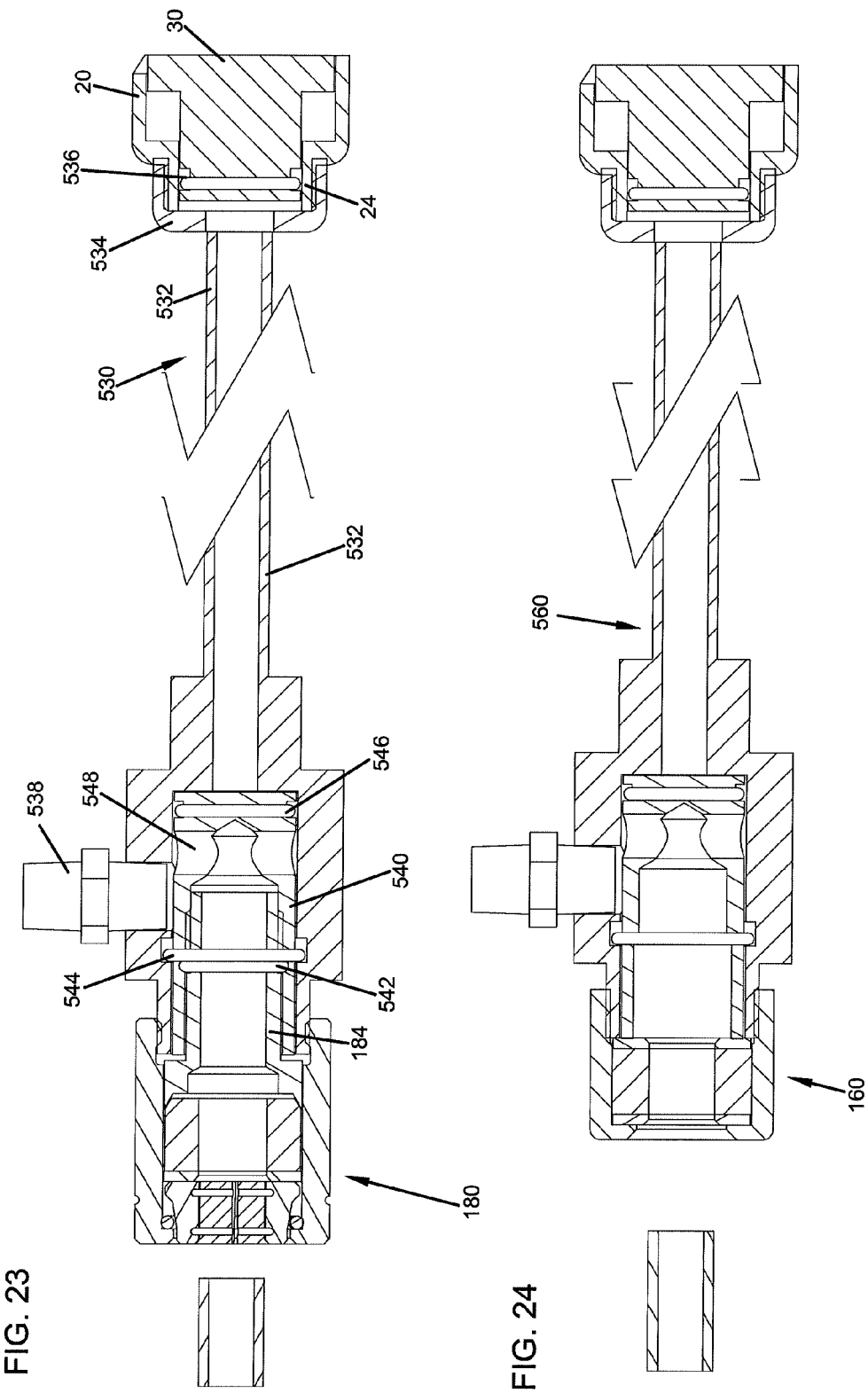

ns are not. Non-modular connector systems that are not described herein are also possible, such as systems with a single connector body, a single connector unit and a single actuator unit.

MODULAR CONNECTOR

This application claims the benefit of U.S. Provisional Application No. 60/947,135, filed on Jun. 29, 2007, the entire contents of which are incorporated herein by reference.

FIELD

A connector that fluidly connects a first fluid system to a second fluid system for performing processing operations, for example charging, evacuation and/or testing, on the second fluid system.

BACKGROUND

A connector is often used to connect an external fluid system, for example charging, evacuation and/or testing equipment, to a second fluid system, for example manufacturing, test, or processing equipment. Once the connection is made and any valves are opened, fluid can flow through the connector either into the second fluid system or from the second fluid system depending on the processing operation being performed.

Connectors are typically designed with one connection interface that enables the connector to be able to connect to the second fluid system in only one way. This means that a typical connector cannot be used to connect to fluid systems that require different connection interfaces on the connector.

Further, conventional connectors are provided with one actuator for actuating the connectors, for example a manual or pneumatic/hydraulic actuator. However, one actuator is not necessarily appropriate for every connection to be made. For example, with manual and pneumatic/hydraulic connector actuation, the connection forces are hard to control which may prevent use of those types of actuators when connecting to a delicate or fragile fluid system. Further, space constraints may limit or prevent use of certain type of actuators.

SUMMARY

A modular connector system is described that permits changes to the connector, for example changes in the type of connection interface that is used and/or changes in the type of actuator that is used to actuate the connector. By making parts of the connector changeable, the connector can be changed so as to be able to connect to different fluid systems. This eliminates the need to have separate connectors for different fluid systems.

In one embodiment, a modular connector system for connecting a first fluid system to a second fluid system includes a connector body having a connector end and an actuator end, and a plurality of connector units. Each connector unit includes a connection mechanism that detachably connects the respective connector unit to the connector end of the connector body. The connection mechanisms of the connector units connect the connector units to the connector end in the same manner, thereby allowing the different connector units to connect to the connector body.

The modular connector system can also include a plurality of actuator units, each of which includes a connection mechanism that detachably connects the respective actuator unit to the actuator end of the connector body. The connection mechanisms of the actuator units can connect the actuator units to the actuator end in the same manner thereby allowing the different actuator units to connect to the connector body.

Any type of detachable connection between the connector body and the connector units and/or actuator units can be used if found suitable. One form of detachable connection described herein comprises threads.

In an embodiment, the connector body includes a generally hollow sleeve having a connector end and an actuator end, with threads at the connector end that enable connection to a connector unit and threads at the actuator end that enable connection to an actuator unit. A piston is slidably disposed within the sleeve so that the piston and the sleeve can move relative to one another.

Each actuator unit can be comprised of an actuation mechanism, and a connection mechanism that detachably connects the respective actuator unit to an actuator end of a connector body. The connection mechanisms connect the actuator units to the actuator end in the same manner.

Each connector unit can comprise means for connecting to the fluid system, and a connection mechanism that detachably connects the respective connector unit to a connector end of a connector body. The connection mechanisms connect the connector units to the connector end in the same manner.

The modular connector system can also include a flexible drive to interconnect the connector body and a connector unit. The flexible drive can include an elongated, hollow flexible tube with a first end and a second end, a connection mechanism at the first end of the tube for detachably connecting the tube to the connector body, and a connection mechanism at the second end of the tube for detachably connecting the tube to the connector unit.

BRIEF DESCRIPTION OF THE DRAWINGS

Further details are explained below with the help of the examples illustrated in the attached drawings in which:

FIG. 1 is a top view of a modular connector in accordance with one exemplary embodiment.

FIG. 2 is a longitudinal cross-sectional view of the modular connector of FIG. 1 taken along line 2-2.

FIG. 5 is a cross-sectional view of the portion contained in area 5 from FIG. 2 showing the connector unit in detail.

FIG. 6 is a cross-sectional view of the actuator unit from FIG. 2.

FIGS. 7-12 illustrate alternative embodiments of connector units of the modular connector system.

FIGS. 13-16 illustrate alternative embodiments of actuator units of the modular connector system.

FIGS. 17-24 illustrate various embodiments of a flexible drive interconnecting the connector body and various connector units.

DETAILED DESCRIPTION

Figure 3:
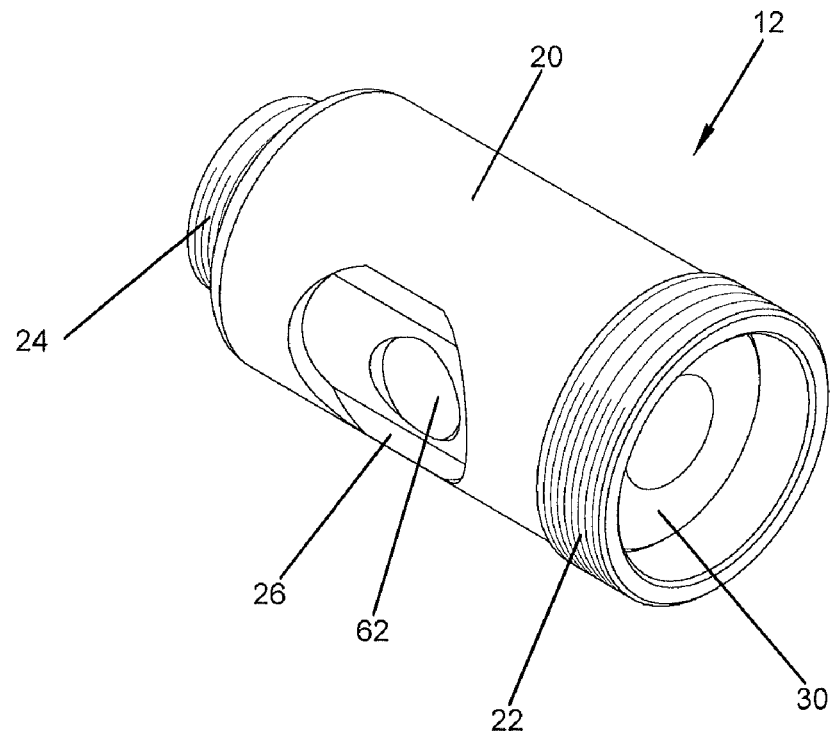
FIG. 3 is a perspective view of a connector body used in the modular connector system.

A modular connector system is described that permits one or more parts of a connector to be changed to permit use of the connector with different fluid systems. As described herein, the connector system includes at least one connector body, a plurality of connector units that are each individually connectable to the connector body, a plurality of actuator units that are each individually connectable to the connector body, and optionally at least one flexible drive that is designed to interconnect the connector body to the connector units. However, alternative connector systems are possible, including those where the connector units can be changed but the actuator unit that is used is fixed, the actuator units can be changed but the connector unit that is used is fixed, the connector body can be changed but the connector unit and the actuator unit are fixed, and various other combinations.

In its simplest form, a modular connector that is produced from the modular connector system includes a connector body, an actuating means for actuating the modular connector, and a means to connect the modular connector to a fluid system for performing processing operations, for example charging, evacuation and/or testing, on the fluid system. The actuating means can be an actuator unit, for example an actuator unit described herein. The means to connect can be a connector unit, for example a connector unit described herein. In certain embodiments, the modular connector can include a flexible drive between the connector body and the means to connect.

With reference initially to FIG. 1, an embodiment of a modular connector 10 is illustrated that can fluidly connect a first fluid system (not shown) to an interface 100 of a second fluid system for performing processing operations, for example charging, evacuation and/or testing, on the second fluid system. The first fluid system to which the modular connector 10 is attached can be, for example, a source of air or helium for testing. The second fluid system to which the modular connector 10 is intended to connect can be, for example, a fluid reservoir. However, the modular connector 10 can be used with other fluid systems in which a connector is used to fluidly connect a first fluid system to a second fluid system.

The modular connector 10 includes a connector body 12, an actuating means in the form of an actuator unit 14 for actuating the connector, and a means to connect in the form of a connection unit 16. With reference to FIG. 2, the actuator unit 14 connects to the connector body 12 in a detachable manner to allow a different actuator unit to be connected to the connector body for actuating the connector 10. Likewise, the connection unit 16 connects to the connector body 12 in a detachable manner to allow a different connection unit to be connected to the connector body for connecting to the interface 100.

Figure 4:
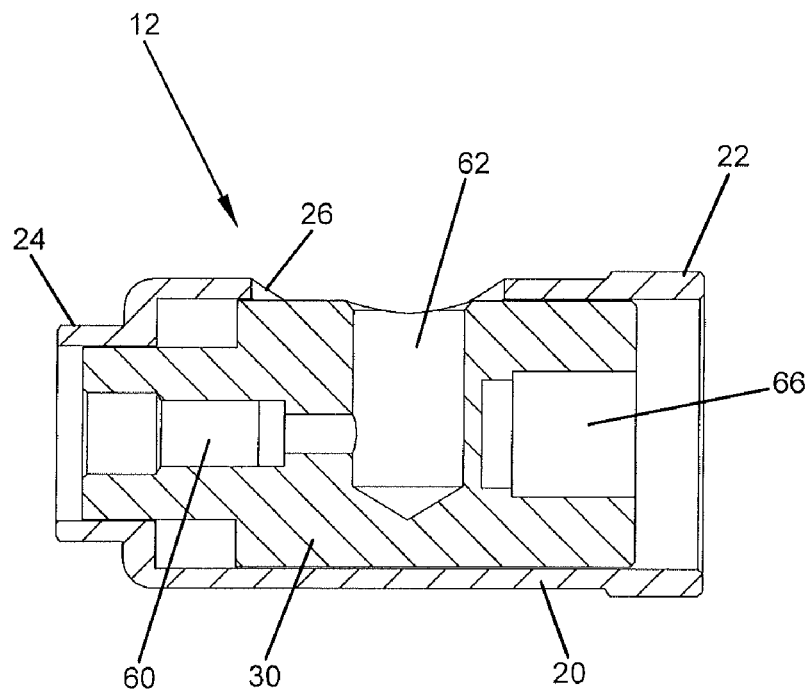
FIG. 4 is a longitudinal cross-sectional view of the connector body.

With reference to FIGS. 3 and 4, the connector body 12 includes a generally hollow, tubular sleeve 20 having an externally threaded back or actuator end 22 and an externally threaded front or connector end 24. The threads form means by which the actuator unit 14 and connection unit 16 connect to the connector body. The back end 22 and front end 24 of the sleeve 20 are both open. The sleeve 20 also includes an elongated slot 26 formed therethrough.

The connector body 12 also includes an actuation piston 30 that is slideably disposed within the sleeve 20 to permit relative sliding movement between the piston 30 and the inside surface of the sleeve 20. The actuation piston 30 includes an internal axial passageway 60 extending through the front end thereof, and a radial passage 62 connected to the axial passageway 60. As shown in FIGS. 1 and 2, a threaded fitting 64 is threaded into the radial passage 62 and forms a means to connect to the first fluid system. The slot 26 in the sleeve 20 accommodates rearward and forward movements of the fitting 64 as the piston 30 moves axially, and the fitting 64 protruding through the slot 26 limits rotational movement of the piston 30. Further, the rear of the piston 30 includes an internally threaded hollow portion 66 at the rear of the actuation piston 30 which engages with the actuator unit 14 in a manner discussed below.

Turning now to FIG. 5, the connection unit 16 includes a tube 70 that is threaded within the axial passageway 60 of the piston and extends beyond the end of the sleeve 20 and the piston 30. Due to the threaded engagement between the tube 70 and the piston 30, axial movement of the piston 30 results in corresponding axial movement of the tube 70. A seal 72 is provided to seal between the outer circumference of the tube 70 and the interior of the passageway 60 to prevent fluid leaks. The tube 70 includes an internal flow passage 74 that communicates with the rear of the passageway 60 and with the radial passage 62 to form a fluid flow passage between the tube 70 and the fitting 64.

The connection unit 16 further includes a cap 80 that is threaded onto the threaded front end 24 of the sleeve 20. The cap 80 includes a central opening 82 through which the tube 70 passes. At the point where the tube 70 extends past the cap 80, the tube 70 includes a reduced diameter section 84 that extends to the front end of the tube 70. A washer 86 is slid over the reduced diameter section 84, followed by a tubular seal 88, and another washer 90. The washer 86, the seal 88 and the washer 90 are retained on the tube 70 by a lock ring 92.

Actuation of the piston 30 is achieved using the actuator unit 14. With reference to FIG. 6, the actuator unit 14 in this embodiment includes an actuation mechanism in the form of an electric actuator 34, and a connection mechanism that detachably connects the actuator unit to the threaded end 22 of the connector body 12.

The connection mechanism of the actuator unit 14 includes an internally threaded hexagonal nut 32 that can thread onto the back end 22 of the sleeve 20 of the connector body 12. The electric actuator 34 in this embodiment takes the form of an electric motor having a drive shaft 36 connected to a suitable reduction mechanism 38, for example a gear box, to increase torque. The electric motor can be connected to any suitable source of electricity, for example a 120V source or to one or more batteries. The reduction mechanism 38 is fixed to the nut 32 via a flange 40 that is integral with the nut 32 and screws 42 that extend through the flange 40 and into threaded receptacles on the reduction mechanism 38. The electric motor is preferably a two-way motor to allow forward and reverse rotation of the drive shaft 36.

The reduction mechanism 38 includes an output 44 that is fixed to a screw drive 46 for rotating the screw drive 46. As shown in FIG. 2, the screw drive 46 extends into the hollow portion 66 at the rear of the actuation piston 30. A drive nut 48 is threaded onto the screw drive 46. The exterior surface of the nut 48 is threaded and is screwed into the hollow portion 66 of the piston 30. The nut 48 also includes a radial flange 52 on the rear end thereof that engages the rear of the piston 30. When the actuator unit 14 is mounted in position, and when the screw drive 46 is rotated, the drive nut 48 is driven in a forward direction toward the connection mechanism 16 or driven in a rearward direction away from the connection mechanism 16. Since the nut 48 is fixed to the piston 30, the piston 30 moves with the nut 48 in either the forward or rearward direction.

As shown in FIG. 6, thrust washers 54 are disposed on either side of a flange 56 at the rear of the screw drive 46 within the nut 32. The thrust washers 54 prevent transfer of thrust to drive gears in the reduction mechanism 38. In addition, a drive support washer 58 is provided between the flange 52 and the thrust washers 54, disposed around the screw drive 46 within the nut 32.

To achieve connection with the interface 100, the projecting end of the tube 70 is inserted into the end of the interface 100. The electric motor is then activated to rotate the screw drive 46 in the appropriate direction to cause the piston 30 to be actuated axially rearwardly. This retracts the tube 70 into the connector 10, which causes the seal 88 to be compressed between the washers 86, 90, due to engagement between the washer 86 and the cap 80. As the seal 88 is compressed, it expands in diameter, and seals against the inner diameter of the interface 100. Processing can then occur through the connector 10, with fluid being able to flow through the connector between the first and second fluid systems. Disconnection is achieved by activating the motor to actuate the piston 30 forwardly to release the compression on the seal 88, returning the connection unit 16 to its original state.

When connected, the connection unit 16 in this embodiment seals with the fluid system interface 100. There is no gripping ability provided by the connection unit 16 other than the friction of the seal 88 against the inner diameter of the fluid system interface.

Other connection units can be used with the modular connector system. Examples of alternative connection units are illustrated in FIGS. 7-12 in which the same reference numerals indicate elements that are similar to those described above.

In FIG. 7, the connection unit 120 that seals and grips with the interface 100 is illustrated. The connection unit 120 is similar in construction and operation to the non-modular connection mechanism disclosed in U.S. Pat. No. 5,343,798 which is incorporated herein by reference in its entirety.

The unit 120 comprises a tube 122 that is threaded within the axial passageway of the piston 30 and extends beyond the end of the sleeve 20 and the piston 30 similar to the tube 70. Due to the threaded engagement between the tube 122 and the piston 30, axial movement of the piston 30 results in corresponding axial movement of the tube 122. A seal 124 is provided to seal between the outer circumference of the tube 122 and the interior of the passageway to prevent fluid leaks. The tube 122 includes an internal flow passage 125 similar to the internal passage 74.

The connection unit 120 further includes a cap 126 that is threaded onto the threaded front end 24 of the sleeve 20. The cap 126 includes a central opening through which the tube 122 passes. A washer 128 is disposed over the tube, followed by a plurality of split collets 130, a wedge 132, and a seal 134. The end of the tube 122 includes a flange 136 that retains the elements on the tube 122. In addition, a resilient ring 138 surrounds the collets 130 to bias the collets to the position shown in FIG. 7.

In use, the end of the connection unit 120 is inserted into the interface 100. When the tube 122 is pulled rearwardly, the seal 134 is compressed and expands into engagement with the inner surface of the interface 100 to seal with the interface. In addition, the collets 130 are ramped outward by the wedge 132 into engagement with the inner diameter to grip with the interface 100.

FIG. 8 shows a connection unit 140 that grips and seals with internal threads of an interface 102. The connection unit 140 is similar in construction and operation to the non-modular connection mechanism disclosed in U.S. Pat. No. 5,788,290 which is incorporated herein by reference in its entirety. The sleeve 20 includes a modified piston 142 that is axially moveable in the sleeve 20. The connection unit 140 includes a sleeve 144 that threads onto the threaded end 24 of the sleeve 20. A hollow tube 146 is connected by threads to the piston 142 and extends into the sleeve 144. A seal 148 is provided around the tube 146 to seal with the inner diameter of the sleeve 144. The unit 140 also includes a plurality of split collets 150 that are pivotally connected to the end of the tube 146, and a resilient ring 152 is disposed around the collets 150 to bias the collets. A pin 154 is disposed inside the collets 150, and includes a tapered front end 156. The pin 154 is supported by a cross-member 158 that is connected to the sleeve 144 via a retaining mechanism 159. The front ends of the collets 150 are slideable on the outside of the pin 154.

In FIG. 8, the connection unit 140 is shown in its default, activated state. To activate the connection unit, the collets 150 are pushed outward over the end 156 of the pin 154 by the piston 142 and tube 146. This permits the ends of the collets 150 to collapse under the bias of the ring 152 to a reduced diameter, allowing the end of the connection unit to be inserted into the interface 102. The collets 150 are then retracted by pulling the piston and the tube toward the connector. As this occurs, the pin 154 causes the collets to expand outward back to the position shown in FIG. 8 so that the outside of the collets grip with the threads on the interface 102. At the same time, the interface 102 seals against the end face of the sleeve 144.

FIG. 9 shows a connection unit 160 that is designed to seal with the outer diameter of an interface 104. The outer diameter can be smooth or it can have threads. There is no gripping ability provided by the connection unit 160 other than the friction of the seal against the outer diameter of the interface 104.

The connection unit 160 includes a sleeve 162 that threads onto the threaded end 24 of the sleeve 20. A seal 164 is disposed inside the sleeve 162, sandwiched between two washers 166, 168. The washer 166 is movable axially within the sleeve 162. In use, the interface 104 is inserted into the connection unit 160. The piston 30 is advanced axially to push the washer 166. This compresses and extrudes the seal 164 against the outer diameter of the interface 104.

FIG. 10 shows a connection unit 180 that grips and seals with the interface 104. The connection unit 180 is similar in construction and operation to the non-modular connection mechanism disclosed in U.S. Pat. No. 5,507,537 which is incorporated herein by reference in its entirety. The connection unit 180 includes a sleeve 182 that threads onto the threaded end 24 of the sleeve 20. A hollow tube 184 is connected by threads to a modified piston 186 and extends partially into the sleeve 182. A seal 188 is disposed inside the sleeve 182, sandwiched between the end of the tube 184 and a washer 190. A plurality of split collets 192 are disposed inside the front end of the sleeve 182, with outer surfaces 194 of the collets 192 being sloped. A wear ring 196 is disposed between the outer surface of the collets 192 and the inner surface of the sleeve 182 so as to reduce the wear on the collets and the sleeve.

In use, the interface 104 is inserted into the connection unit 180. The piston 186 is advanced axially to push against the seal 188. This compresses and extrudes the seal 188 against the outer diameter of the interface 104. At the same time, the collets 192 are ramped inward onto the outer diameter to grip the interface 104.

FIGS. 11A-E show a connection unit 200 that is configured to seal with an interface 106 and to grip onto the interface 106 which is externally threaded or includes another feature that can be used for gripping, for example a bead, barb, bump, etc.

Figure 11A:
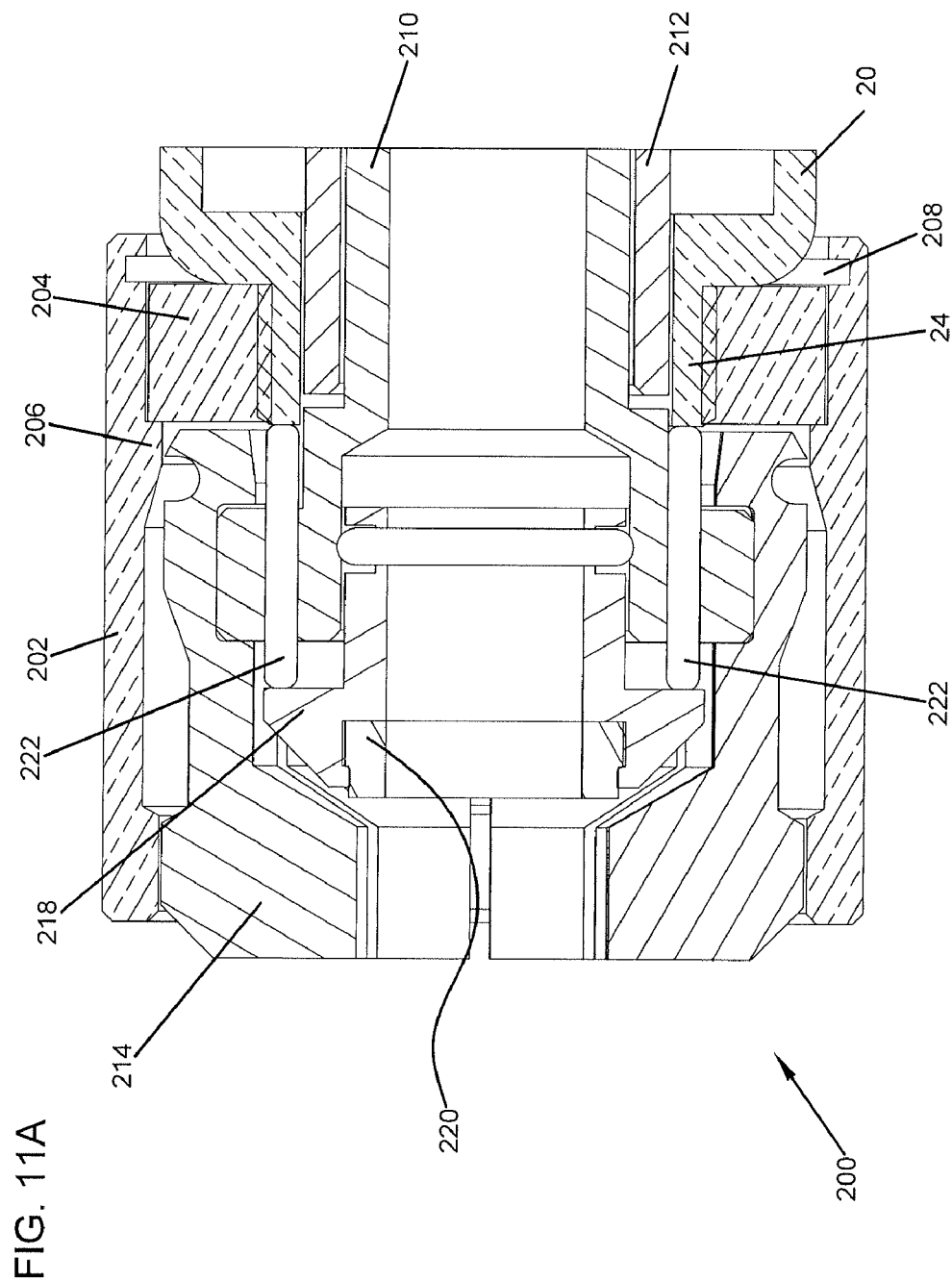

With reference to FIG. 11A, which shows the connection unit 200 in a default position, the connection unit 200 includes a sleeve 202, and a lock ring 204 is threaded onto the threaded end 24 of the sleeve 20. The lock ring 204 is disposed between a shoulder 206 on the sleeve 202 and a retainer 208 secured to the rear of the sleeve. A hollow tube 210 is threaded into a modified piston 212 and extends into the sleeve 202. A plurality of collets 214 are pivotally secured to the end of the tube 210, and a resilient biasing member 216 (FIG. 11B), for example a o-ring, biases the collets outward.

In addition, a sealing piston 218 is disposed inside the end of the tube 210 and inside the collets 214. A main seal 220 is secured to the end of the piston 218 for sealing engagement with the interface 106. Further, a plurality of push pins 222 extend through the end of the tube 210 and are engaged with the rear of the piston 218 and the end 24 of the sleeve 20.

Figure 11B:
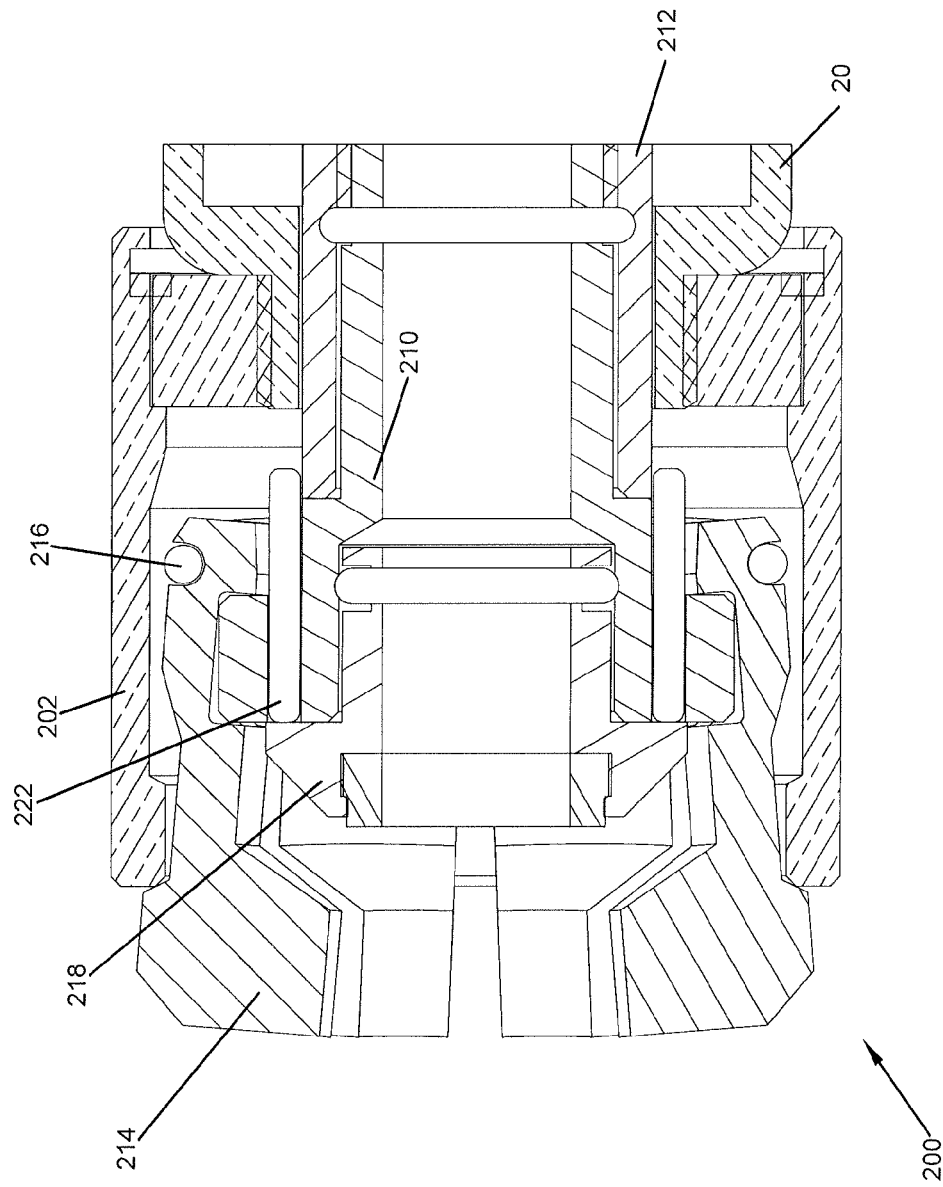

FIG. 11B shows the connection unit 200 in an open position, with the front ends of the collets 214 advanced axially by the piston 212 from the front end of the sleeve 202 which remains stationary with the sleeve 20. The biasing force provided by the biasing member 216 causes the collets 214 to pivot open to facilitate insertion of the interface 106. In addition, the front end of the tube 210 advances relative to the pins 222 to a position adjacent the rear side of the piston 218. This permits the interface 106 to be inserted a maximum distance into the connection unit 200.

Figure 11C:
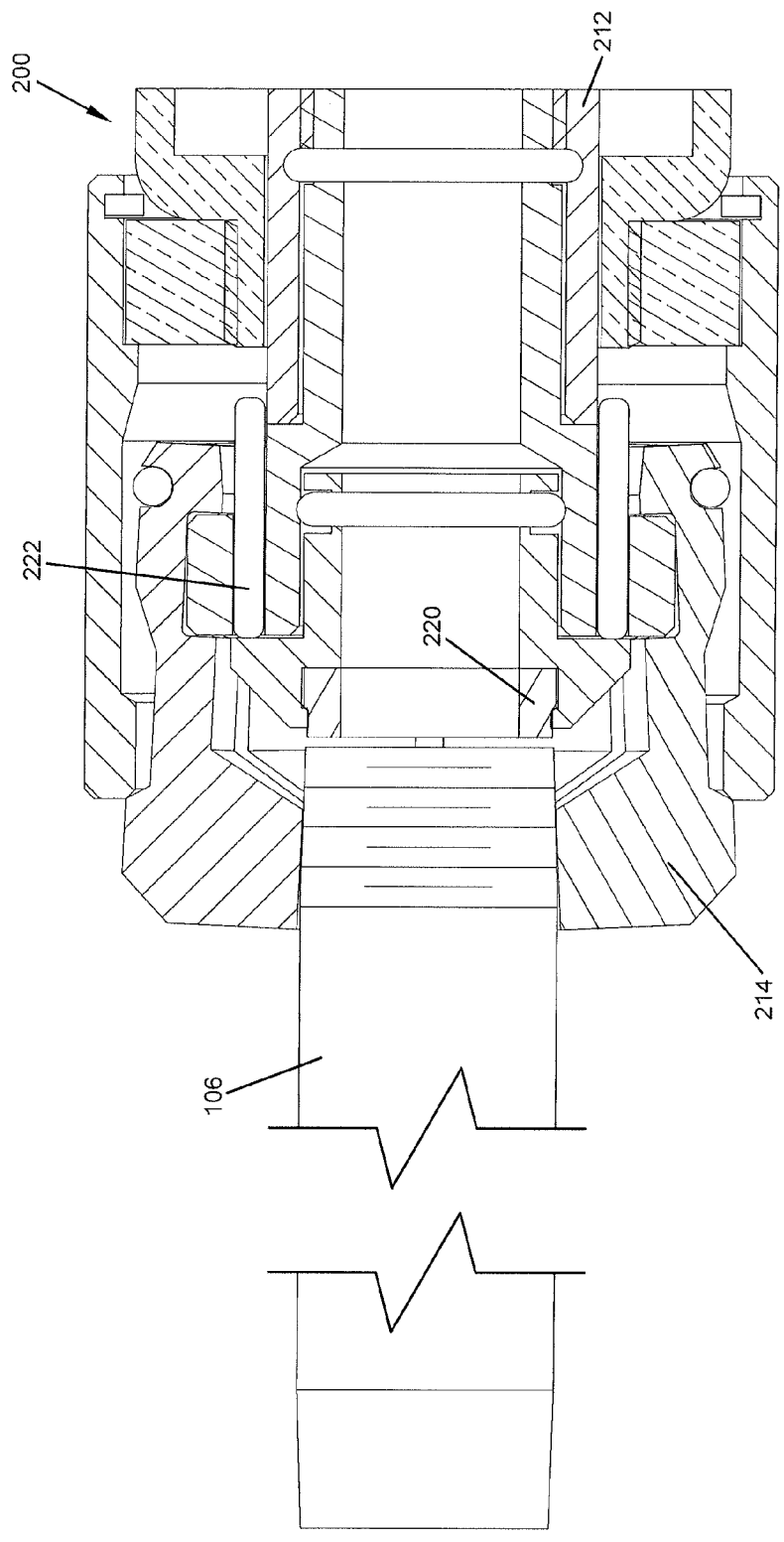

FIG. 11C illustrates the start of connection. The interface 106 is inserted up to the main seal 220 and the piston 212 starting to be pulled back into the connector. The interior of the collets 214 are threaded. As a result, during connection as the collets close over the threads on the interface 106, the threads may not exactly align. This can cause the interface 106 to back off the seal 220 slightly, for example up to ½ a thread, to match threads. The push pins 222 do not provide any function during the start of connection.

Figure 11D:
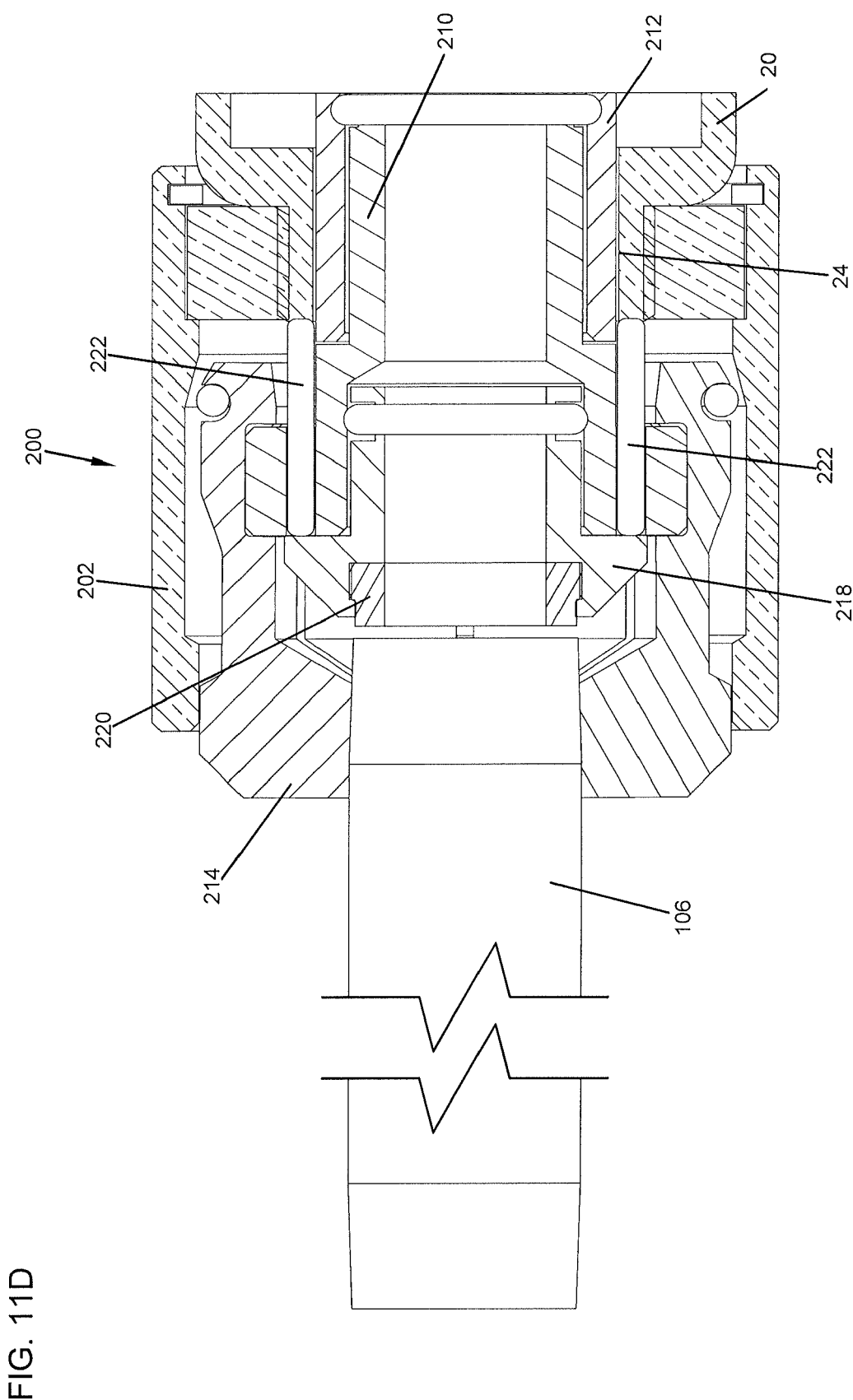

FIG. 11D illustrates the connector in mid connection. The piston 212 continues to draw the tube 210, collets 214, interface 106 and the sealing piston 218 into the sleeve 202 and the sleeve 20. When the push pins 222 contact the end 24 of the sleeve 20, the movement of the sealing piston 218 is stopped.

Figure 11E:
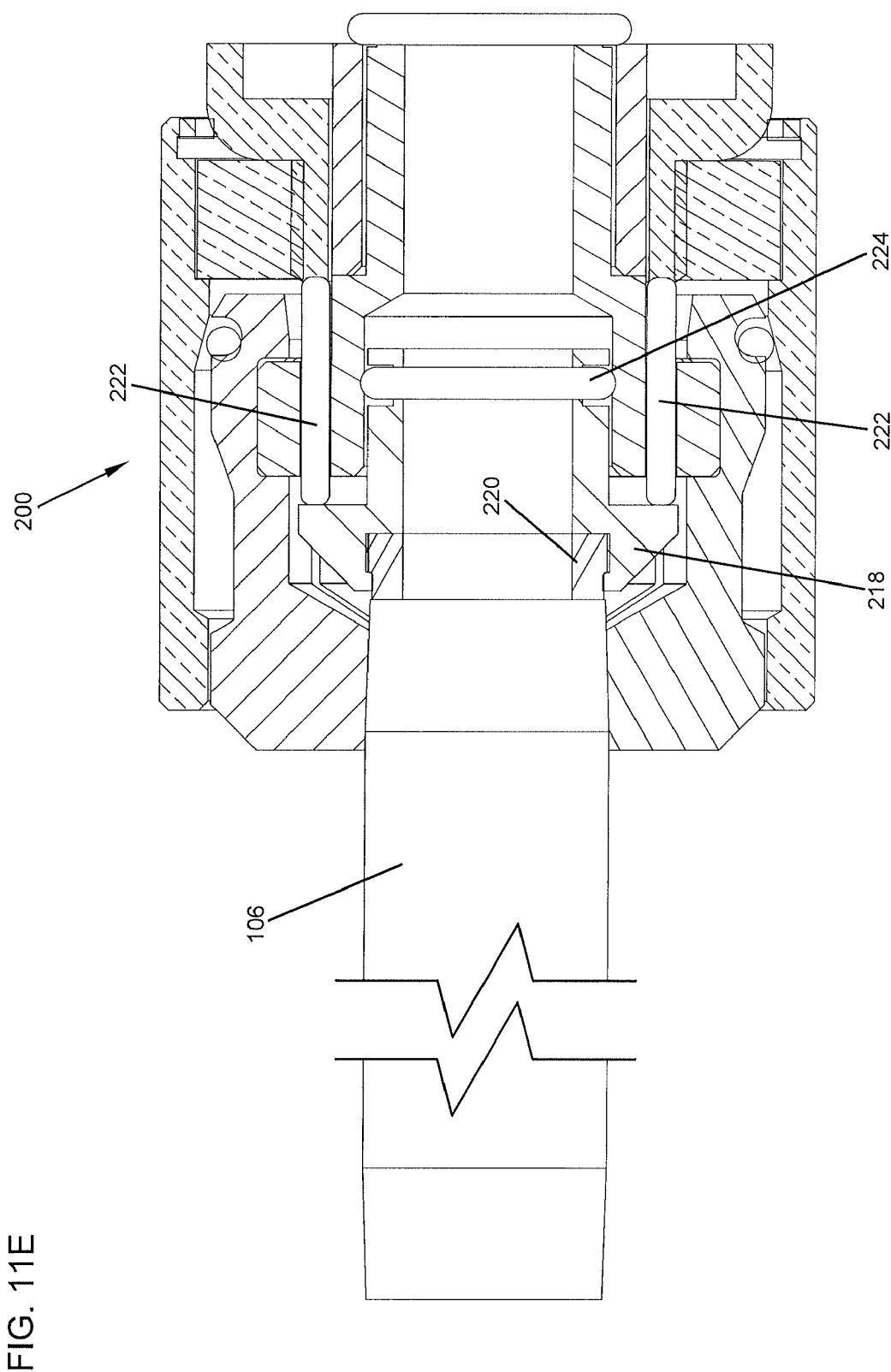

FIG. 11E illustrates the connector at full connection. As connection continues between FIGS. 11D and 11E, the push pins 222 continue to stop movement of the sealing piston 218. As the interface 106 continues to be drawn into the connector, the interface 106 seals tightly against the main seal 220. A seal 224 is provided that seals between the sealing piston 218 and the interior of the tube 210. The seal 224 of the sealing piston 218 provides a larger sealing diameter than the main seal 220 so when under pressure, the sealing piston will generate a greater seal against the interface 106.

Figure 12:
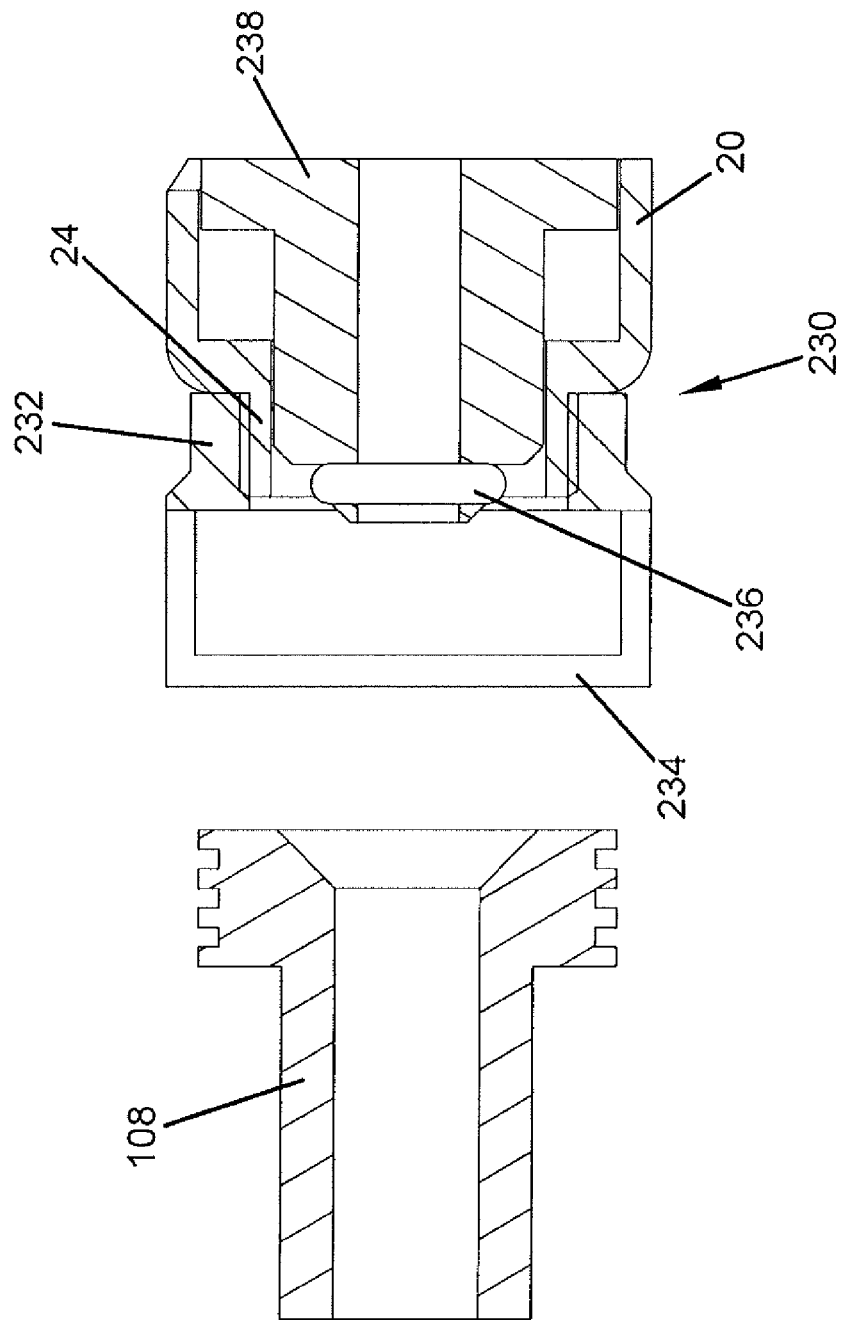

FIG. 12 shows a connection unit 230 that grips and seals with an interface 108. The connection unit 230 is similar in construction and operation to the non-modular connection mechanism disclosed in U.S. patent application Ser. No. 11/671,747 which is incorporated herein by reference in its entirety. The connection unit 230 has a semi-cylindrical nest 232 that includes a flange 234 that is configured to grip over a thread or another feature on the interface 108. The nest 232 is threaded onto the threaded end 24 of the sleeve 20. A seal 236 is disposed at the end of a piston 238 configured to seal with an internal diameter of the interface 108.

In use, the interface 108 is inserted into the nest 232 so that the flange 234 grips over the threads or other feature on the interface. The piston 238 is then actuated forward into the interface 108 so that the seal 236 seals against the inner diameter of the interface 108.

Connection units other than those described and illustrated herein can be used, provided they are found suitable for modularity.

As should be apparent, the connector units described above share a common connection mechanism, for example threads, that detachably connects the respective connector unit to the connector end of the connector body and connect the connector units to the connector end in the same manner.

To further enhance modularity, other actuator units can be used with the modular connector system. Examples of alternative actuator units are illustrated in FIGS. 13-16 in which the same reference numerals indicate elements that are similar to those described above.

Figure 13:
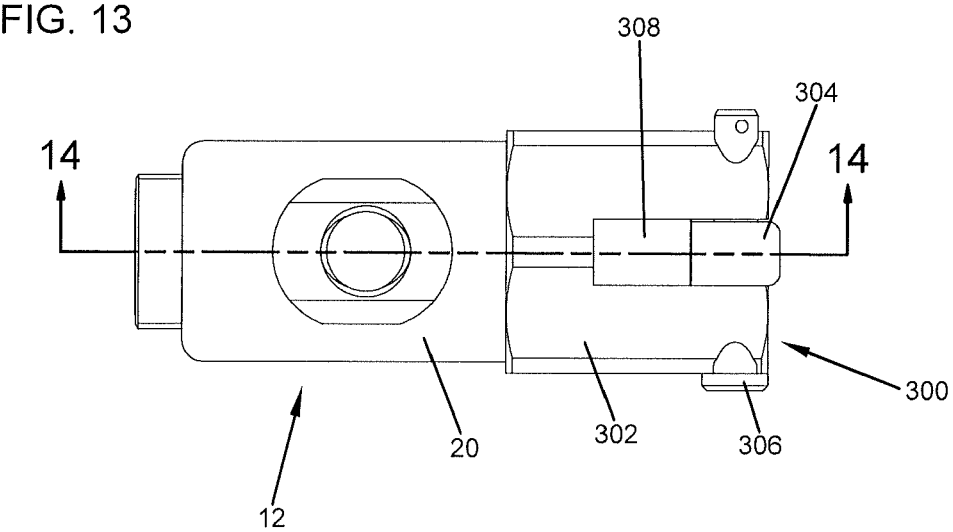
Figure 14:
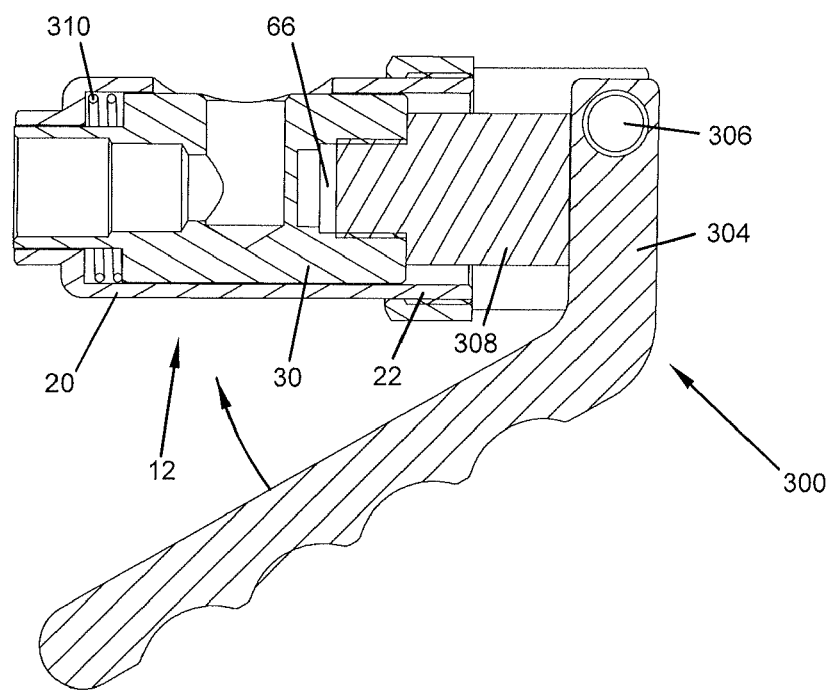

FIGS. 13 and 14 provide a top view and a cross-sectional side view, respectively, of a manually activated actuator unit 300 shown connected to the back end 22 of the connector body 12.

The actuator unit 300 includes an internally threaded hexagonal nut 302 that can thread onto the back end 22 of the sleeve 20 of the connector body 12. The rear end of the nut 302 is slotted and a temporary force squeeze handle 304 is pivotally attached to the nut 302 by a pin 306 for providing a temporary compression motion. A piston 308 is threaded into the hollow portion 66 of the actuation piston 30 to fix the piston 308 to the piston 30. The rear end of the piston 308 is engaged with the squeeze handle 304.

When the squeeze handle 304 is squeezed in the direction of the arrow, the piston 308 and piston 30 are pushed forward to actuate the connector unit. When the handle 304 is released, the pistons 30, 308 are biased by a suitable biasing means, for example a coil spring 310, back to their position shown and the handle 304 returned to its original position.

FIG. 15 is a cross-sectional side view of a manually activated actuator unit 320 shown connected to the back end 22 of the connector body 12 which is only partially illustrated. The actuator unit 320 includes an internally threaded hexagonal nut 322 that can thread onto the back end 22 of the sleeve 20 of the connector body 12. The rear end of the nut 322 is slotted and a flip handle 324 is pivotally attached to the nut 322 by a pin 326. A piston 328 is threaded into the hollow portion of the actuation piston 30 to fix the piston 328 to the piston 30. The rear end of the piston 328 is engaged with the flip handle 324.

The flip handle 324 provides a constant compression force. FIG. 15 illustrates the deactivated or default position. When the handle 324 is rotated up or down, the piston 328 and the piston 30 are pushed forward to actuate the connector unit. When the handle 324 is rotated back to the position shown in FIG. 15, the pistons 30, 328 are biased by a suitable biasing means, for example a coil spring acting between the connector body 12 and the piston 30, back to their position.

FIG. 16 is a cross-sectional side view of a pneumatic/hydraulic activated actuator unit 330 shown connected to the back end 22 of the connector body 12 which is only partially illustrated. The actuator unit 330 includes an internally threaded hexagonal nut 332 that can thread onto the back end 22 of the sleeve 20 of the connector body 12. The nut 332 includes a fluid port 334 for pneumatic/hydraulic fluid. An o-ring 336 is disposed around a modified piston 338 that functions similarly to the piston 30. The piston 338 has a circumferential channel 340 that receives the o-ring 336.

In use, pressurized fluid, for example air or hydraulic fluid, is introduced through the port 334 and acts on the rear of the piston 338. This pushes the piston 338 to actuate the connection unit. The force applied to the piston 338 can be a constant force if a constant fluid pressure is applied, or momentary if the fluid pressure is reduced. When air is used as the pressurized fluid, a spring may be used to bias the piston 338 back to the deactivated position. When hydraulic fluid is used, a biasing spring can be used to bias the piston back to the deactivated position, or withdrawal of the hydraulic fluid can cause the piston to pull back due to suction.

In certain case, the modular connector is used in tight spaces that make it difficult for both the connection unit and the actuator unit to be located in that space. Therefore, a flexible drive, examples of which are illustrated in FIGS. 17-24, can be provided between the connector body and the connection unit.

FIG. 17 illustrates a flexible drive 400 between the connector body 12 and the connection unit 16 illustrated in FIG. 5.

The flexible drive 400 includes a flexible external sleeve 402 having a cap 404 at one end that is threaded onto the front end 24 of the sleeve 20. The opposite end 406 of the sleeve 402 is externally threaded and the cap 80 of the connection unit 16 is threaded onto the end 406. The sleeve 402 can be made of a suitable flexible material, for example an elastomer.

A flexible, hollow shaft 410 is disposed inside the sleeve 402. One end 412 of the shaft 410 is fixed to the piston 30 by threads, while the other end 414 of the shaft 410 is fixed to the tube 70 of the connection unit 16. The shaft 410 includes a flow passage 416 to allow fluid to flow therethrough from the connection unit 16 to the connector body 12. The shaft 410 is movable relative to the sleeve 402 to enable the shaft 410 to be pushed or pulled by the piston 30 to actuate the connection unit 16. For example, when the piston 30 is actuated backward, the piston 30 pulls the shaft 410 backward, which retracts the tube 70 to actuate the connection unit 16 as described above.

FIG. 18 illustrates a flexible drive 430 similar in construction and function to the flexible drive 400. One end of the drive 430 is connected to the connector body 12 in the same manner as the flexible drive 400, while the opposite end is connected to the connection unit 120 illustrated in FIG. 7. The drive 430 includes a flexible external sleeve 432 and a hollow, flexible shaft 434 movable inside the sleeve 432, with the shaft 434 defining a flow passage 436 for fluid.

The flexible drives in FIGS. 17 and 18 can be used with any connection unit, including any connection unit described herein, which is activated by pushing or pulling of the shaft.

FIG. 19 illustrates a flexible drive 450 that utilizes hydraulic actuation. The flexible drive 450 is connected between the connector body 12 and the connection unit 140 illustrated in FIG. 8. The flexible drive 450 includes a flexible external sleeve 452 having a cap 454 at one end that is threaded onto the front end 24 of the sleeve 20. The opposite end 456 of the sleeve 452 is externally threaded and the sleeve 144 of the connection unit 140 is threaded onto the end 456.

A flexible, hollow shaft 460 is disposed inside the sleeve 452. One end 462 of the shaft 460 is disposed inside the piston 30, while the other end 464 of the shaft 460 is fixed to the tube 146 of the connection unit 140. The end 464 of the shaft 460 is formed into a piston 466 that is fixed to the tube 146 and is slideable within the end 456 of the sleeve 452. O-rings 468, 470 are provided to seal between the tube 146 and the piston 466, and between the piston 466 and the sleeve 452, respectively. The shaft 460 includes a flow passage 472 to allow fluid to flow therethrough between the connection unit 140 and the connector body 12. In addition, a space 474 is provided between the sleeve 452 and the shaft 460 for hydraulic fluid In addition, the front end of the piston 30 is modified with an exterior channel to receive an o-ring 476 for sealing with the interior of the sleeve 20, and an interior channel 478 to receive an o-ring for sealing with the exterior of the end 462. Thus, an enclosed hydraulic chamber is defined between the front end of the piston 30, the space 474, and the rear end 480 of the piston 466.

When the piston 30 is actuated in a forward direction, the volume of the hydraulic chamber is reduced which increases the pressure of the hydraulic fluid. The fluid then pushes on the rear end 480 of the piston 466, which actuates the tube 146 to activate the connector as described above for FIG. 8.

FIG. 20 illustrates a flexible drive 500 that is similar in construction and function to the flexible drive 450, and that is connected between the connector body 12 and the actuation unit 160 described above in FIG. 9.

Figure 21:
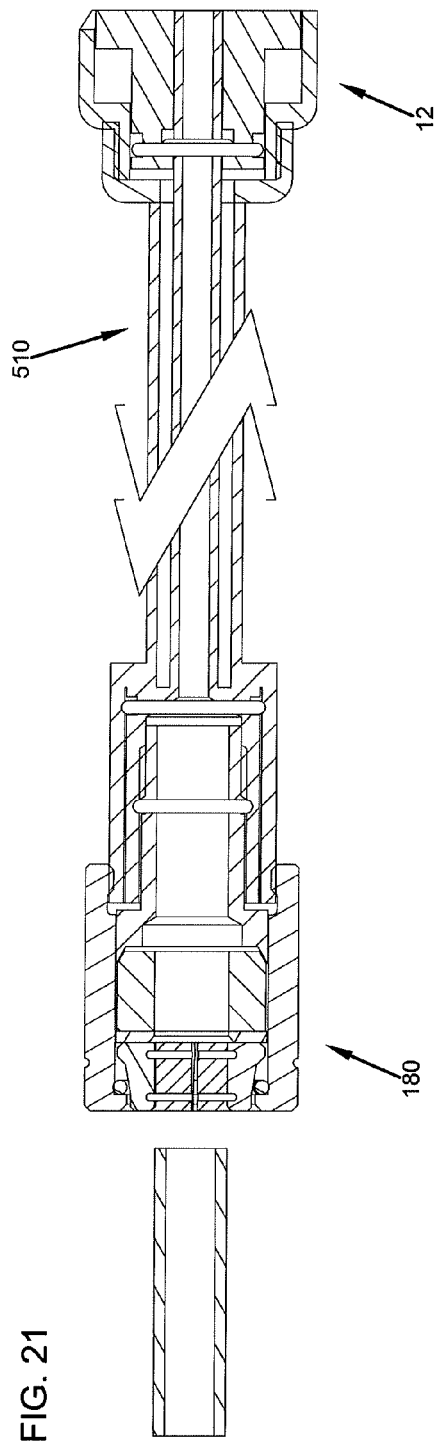

FIG. 21 illustrates a flexible drive 510 that is similar in construction and function to the flexible drive 450, and is connected between the connector body 12 and the actuation unit 180 described above in FIG. 10.

Figure 22:
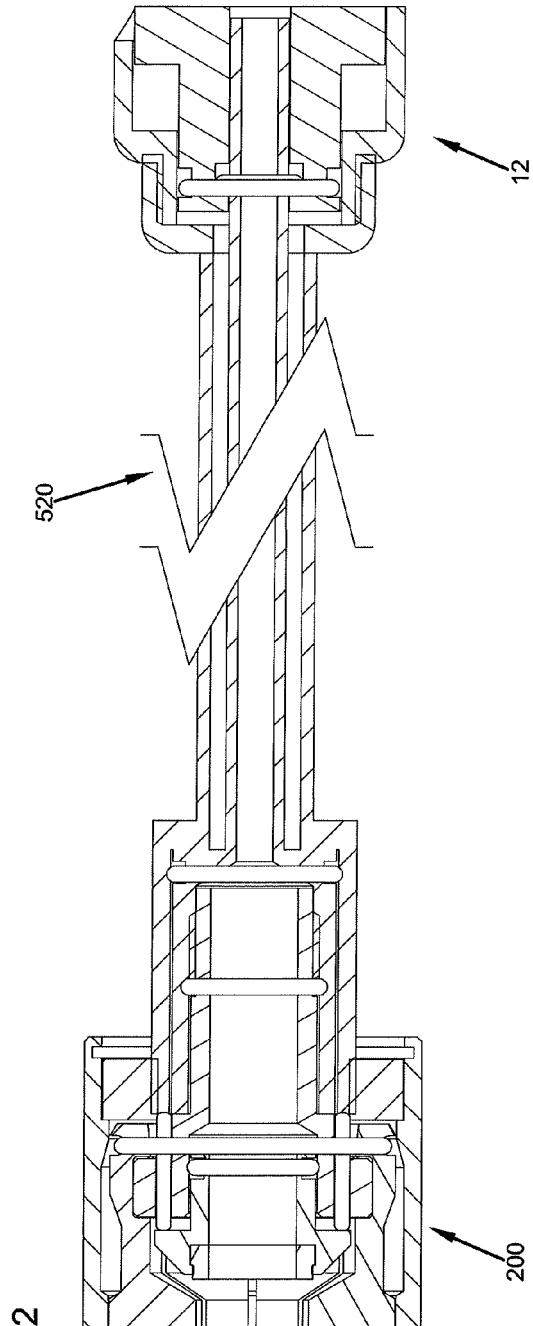

FIG. 22 illustrates a flexible drive 520 that is similar in construction and function to the flexible drive 450 connected between the connector body 12 and the actuation unit 200 described in FIGS. 11A-E.

FIG. 23 illustrates a flexible drive 530 that utilizes hydraulic activation but where the processing fluid exits from the connection unit through the forward end of the flexible drive 530. The flexible drive 530 includes a hollow, flexible hydraulic line 532 that contains hydraulic fluid. One end of the line 532 is connected by a cap 534 to the end 24 of the sleeve 20. The front end of the piston 30 is modified with an exterior channel to receive an o-ring 536 for sealing with the interior of the sleeve 20.

The opposite end of the line 532 is of enlarged size and includes a threaded fitting 538 secured thereto for passage of process fluid. The line 532 is connected to the connection unit 180 described in FIG. 10. A piston 540 is disposed within the enlarged end of the line 532, with the piston secured to the tube 184. O-rings 542, 544 are provided forwardly of the fitting 538 to seal between the piston 540 and the tube 184, and between the piston 540 and the interior of the line 532. In addition, an o-ring 546 is provided to seal between the rear of the piston 540 and the interior of the line 532. In addition, radial flow passages 548 are formed in the piston 540 and fluidly connect the hollow interior of the tube 184 with the fitting 538 to permit processing fluid to flow.

In use, actuation of the piston 30 in a forward direction decreases the volume of the hydraulic chamber, causing the hydraulic fluid to push on the rear of the piston 540 thereby forcing the piston, and the tube 184, forward to activate the connection unit 180 as described above in FIG. 10.

FIG. 24 illustrates a flexible drive 560 that is similar in construction and function to the flexible drive 530, but which is connected to the connection unit 160 described above in FIG. 9.

The flexible drives of FIGS. 19-24 can be used with any connection unit, including any connection unit described herein, which is suitable for being activated by the hydraulic activation that is described.

Figure 25:
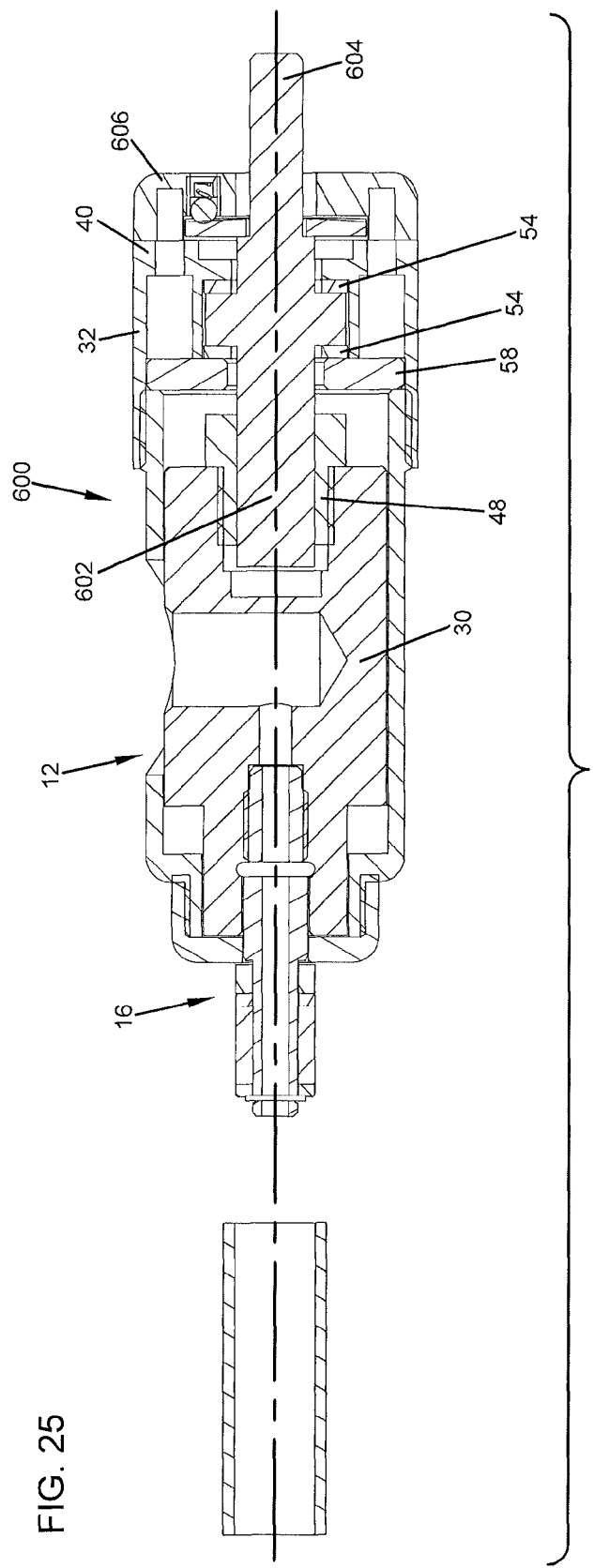
FIG. 25 illustrates an embodiment without an integrated actuator unit fixed to the connector.

FIG. 25 illustrates an embodiment of a connector 600 that includes the connector body 12, and a connection unit, for example connection unit 16. In FIG. 25, the same reference numerals indicate elements that are similar to those described above in FIGS. 1-6. The connector 600 is similar to the connector 10 described above, except that the electric motor 34 and the reduction mechanism 38 are not connected to the connector 600. Instead, the connector 600 is provided with an interface to which a drive mechanism connects to actuate the connector. With this embodiment, the drive mechanism can stay with a station while the connector 600 moves down an assembly line connected to the interface of the second fluid system. At the end of the assembly line, another drive mechanism can be provided to remove the connector 600 from the second fluid system.

The interface of the connector 600 includes a screw drive shaft 602 connected to the drive nut 48. The shaft 602 extends rearwardly to a free end 604 that is suitably shaped for engagement by a drive mechanism. A clutch mechanism 606 is fixed to the rear of the nut 32 via the flange 40. The clutch mechanism 606 resists unwanted loosening of the connector 10 while traveling down the assembly line.

In use of the connector 600, a drive mechanism (not shown) at a station is connected to the connector 600. The drive mechanism connects to the nut 32 and to the free end 604 of the shaft 602. Engagement with the nut 32 prevents rotation of the nut and connector during rotation of the shaft 602. The drive mechanism then rotates the shaft 602 to actuate the drive nut 48 and the connection unit 16 as described above for FIGS. 1-6.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A modular connector system for connecting a first fluid system to a second fluid system, comprising:
    a connector body having a generally hollow sleeve with a connector end and an actuator end, the connector end and the actuator end have threaded surfaces, and a piston slidably disposed within the sleeve so that the piston and the sleeve can move relative to one another, the piston having a first axial end and a second axial end;
    the piston includes an axial fluid passageway and a radial fluid passageway, the axial fluid passageway extending from the radial fluid passageway to the first axial end of the piston, and a fitting is fixed to the radial fluid passageway and projects from the piston beyond an exterior surface of the sleeve for connection to the first fluid system, and the piston is not sealed with the sleeve by a sealing member between the radial fluid passageway and the actuator end;
    the second axial end of the piston includes an internally threaded hollow portion located on a central axis of the piston that does not extend into the axial fluid passageway and the radial fluid passageway;
    a plurality of actuator units, each actuator unit including a portion that is threadably connectable to the internally threaded hollow portion;
    a plurality of connector units each of which includes a threaded connection mechanism that detachably connects the respective connector unit to the connector end of the sleeve; and
    the threaded surface at the connector end of the connector body hollow sleeve enables connection to the threaded connection mechanism of one of the connector units and the threaded surface at the actuator end of the connector body hollow sleeve enables connection to a respective one of the actuator units.

2. The modular connector system of claim 1, wherein the connector units each include a seal positioned to seal with the second fluid system.

3. The modular connector system of claim 1, wherein the actuator units comprise one of an electric actuator with a screw drive and a fluid actuated actuator.

4. The modular connector system of claim 1, wherein the sleeve is configured to allow the fitting to extend through the sleeve.

5. The modular connector system of claim 1, wherein each actuator unit includes:
    an actuation mechanism; and
    a threaded connection mechanism that detachably connects the respective actuator unit to the threaded surface at the actuator end of the connector body.

6. The modular connector system of claim 5, wherein the actuation mechanisms comprise an electric actuator with a screw drive or a fluid actuated actuator.

7. The modular connector system of claim 1, further comprising a flexible drive useable in the modular connector system to interconnect the connector body and the connector units, the flexible drive including:
    an elongated, hollow flexible tube with a first end and a second end;
    a threaded connection mechanism at the first end of the tube for detachably connecting the tube to the threaded surface at the connector end of the sleeve
    a threaded connection mechanism at the second end of the tube for detachably connecting the tube to a respective one of the threaded connection mechanisms of the connector units;
    an elongated, flexible shaft disposed within the tube, the elongated, flexible shaft including a first end with threads for detachably connecting the elongated, flexible shaft to the piston and a second end that is fixable to a movable member of the connector units; the elongated, flexible shaft is axially movable relative to the tube; and the elongated, flexible shaft defines a fluid passageway that permits fluid to flow therethrough from the connector unit to the axial fluid passageway of the piston.

8. The modular connector system of claim 7, wherein the elongated, hollow flexible tube is made from an elastomeric material.

9. The modular connector system of claim 7, further comprising a space defined between the tube and the shaft for receiving hydraulic fluid, the space is fluidly separated from the fluid passageway of the elongated, flexible shaft to prevent mixing of fluid in the fluid passageway of the elongated, flexible shaft with hydraulic fluid in the space.

10. The modular connector system of claim 1, wherein each of the connector units further includes:
    a tube with threads at a first end thereof for threaded connection to the piston so that the tube is moveable with the piston, and when the tube is threadedly attached to the piston a second end of the tube extends beyond the connector end of the generally hollow sleeve, the tube defining a fluid passageway that is in fluid communication with the axial fluid passageway of the piston and the radial fluid passageway of the piston; and
    a mechanism that connects the connector unit to the second fluid system, the mechanism is separate from the tube and is configured to be actuated by movement of the tube with the piston.

11. The modular connector system of claim 10, further comprising a seal between an outer circumference of the tube and the piston.

12. A modular connector system for connecting a first fluid system to a second fluid system, the modular connector system comprising:
    a connector body having:
        a sleeve having a connector end and an actuator end, threads at the connector end that enable connection to a connector unit and threads at the actuator end that enable connection to an actuator unit; and
    a piston slidably disposed within the sleeve so that the piston and the sleeve can move relative to one another, the piston includes a first axial end and a second axial end, the piston includes an axial fluid passageway and a radial fluid passageway, the axial fluid passageway extending from the radial fluid passageway to the first axial end of the piston, and a fitting is fixed to the radial fluid passageway and projects from the piston beyond an exterior surface of the sleeve for connection to the first fluid system, and the second axial end of the piston includes an internally threaded hollow portion located on a central axis of the piston that does not extend into the axial fluid passageway and the radial fluid passageway;

a plurality of connector units each of which includes:
  a means for connecting to the second fluid system, a connection mechanism that detachably connects the respective connector unit to the connector end of the connector body; and
  the connection mechanism of each of the connector units connect the connector units to the connector end in the same manner;

a plurality of actuator units each of which includes:
  an actuation mechanism;
  a connection mechanism that detachably connects the respective actuator unit to the actuator end of the connector body;
  the connection mechanism of each of the actuator units connect the actuator units to the actuator end in the same manner, and a portion that is threadably connectable to the internally threaded hollow portion of the piston at the second axial end;

and optionally a plurality of flexible drives each of which is configured to connect the connector body with one of the connector units, each flexible drive includes:
  an elongated, hollow flexible tube with a first end and a second end;
  a connection mechanism at the first end of the tube for detachably connecting the tube to the connector end of the connector body; and
  a connection mechanism at the second end of the tube for detachably connecting the tube to the connection mechanism of one of the connector units.

* * * * *